United States Patent [19]

Furuya et al.

[11] Patent Number: 5,272,726
[45] Date of Patent: Dec. 21, 1993

[54] BLIND TYPE SEQUENCE ESTIMATOR FOR USE IN COMMUNICATIONS SYSTEM

[75] Inventors: Yukitsuna Furuya; Akihisa Ushirokawa, both of Tokyo, Japan

[73] Assignee: NEC Corporation, Japan

[21] Appl. No.: 738,352

[22] Filed: Jul. 31, 1991

[30] Foreign Application Priority Data

Jul. 31, 1990 [JP] Japan ................................. 2-203436
Nov. 16, 1990 [JP] Japan ................................. 2-312035
Nov. 19, 1990 [JP] Japan ................................. 2-313724

[51] Int. Cl.⁵ ............................................. H04L 27/06
[52] U.S. Cl. ........................................ 375/94; 371/43; 341/51
[58] Field of Search ................ 375/39, 94, 99, 100, 375/101; 371/43; 341/51

[56] References Cited

U.S. PATENT DOCUMENTS

| | | | |
|---|---|---|---|
| 5,029,186 | 7/1991 | Maseng et al. | 375/94 |
| 5,065,411 | 11/1991 | Muto | 375/100 |
| 5,081,651 | 1/1992 | Kubo | 375/94 |
| 5,091,918 | 2/1992 | Wales | 375/99 |
| 5,127,025 | 6/1992 | Okanoue | 375/100 |
| 5,202,903 | 4/1993 | Okanoue | 375/96 |

Primary Examiner—Curtis Kuntz
Assistant Examiner—T. Ghebretinsae
Attorney, Agent, or Firm—Ostrolenk, Faber, Gerb & Soffen

[57] ABSTRACT

A sequence estimator for estimating a data sequence which is to be transmitted using a Viterbi processor, includes a register for storing, at a predetermined time interval, signals applied to the sequence estimator. A channel impulse response calculator is provided to receive the signals stored in the register which determine an estimated channel impulse response of each of possible transmitted data sequences. The sequence estimator further includes a branch metric calculator which determines a plurality of branch metrics using the receive signal, the possible transmitted data sequence and the estimated channel impulse response.

9 Claims, 5 Drawing Sheets

BLIND TYPE SEQUENCE ESTIMATOR FOR USE IN COMMUNICATIONS SYSTEM

BACKGROUND OF THE INVENTION

1. Field of the Invention

The present invention relates generally to a method and arrangement for correctly estimating channel responses and more specifically to a method and arrangement which is capable of following rapid changes in channel characteristics. The present invention is well suited for use in mobile communications systems merely by way of example.

2. Description of the Prior Art

It is known in the art of a radio communications system that a receiver using maximum-likelihood sequence estimation exhibits extremely low error rate and particularly in the case of intersymbol interference. This maximum-likelihood sequence estimation technique is disclosed in an article published in IEEE Transactions on Information Theory, Vol. IT-18, No. 3, May 1972, entitled "Maximum-Likelihood Sequence Estimation of Digital Sequences in the Presence of Intersymbol Interference" by G. D. Forney Jr. (paper 1).

In order to meet the situation wherein channel impulse responses vary with respect to time, an adaptive maximum-likelihood receiver has been proposed and disclosed in an article published in IEEE Transactions on Communications, Vol. Com-22, No. 5, May 5, 1974, entitled "Adaptive Maximum-Likelihood Receiver for Carrier-Modulated Data-Transmission Systems" by Gottfried Ungerboeck (paper 2). This type of arrangement or method utilizes a known training sequence, which is previously sent to a receiver in order to enable initial estimation of channel response of later data transmission. Following this, a decision sequence is generated from a sequence estimator with a certain delay using an adaptive algorithm. However, this algorithm has been unable to follow very rapid changes in channel characteristics.

SUMMARY OF THE INVENTION

It is an object of the present invention to provide a method/arrangement of the above nature which enables rapid changes in channel characteristics to be followed.

A further object of the present invention is to provide a method/arrangement of the above described nature wherein proper operation of a sequence estimator is enabled even under conditions wherein channel impulse response cannot be solved.

Another object of the present invention is to provide an arrangement wherein channel impulse responses are averaged over two or more time points in a manner which enables sudden changes due to noise to be smoothed and the effect thereof to be attenuated.

A further object of the present invention is to provide an arrangement which includes a recursive type filter for effectively smoothing channel impulse responses with a simple hardware configuration.

In brief, the above object is achieved by an arrangement/method wherein a sequence estimator for estimating a data sequence transmitted using a Viterbi processor, includes a register for storing, at a predetermined time interval, signals applied to the sequence estimator. A channel impulse response calculator is provided to receive the signals stored in the register which determine an estimated channel impulse response of each of possible transmitted data sequences. The sequence estimator further includes a branch metric calculator which determines a plurality of branch metrics using the receive signal, the possible transmitted data sequence and the estimated channel impulse response.

More specifically an aspect of the present invention is deemed to relate to an arrangement of a sequence estimator for estimating a data sequence transmitted using a Viterbi processor, comprising: first means for storing, at a predetermined time interval, signals applied to the sequence estimator; second means coupled to receive the signals stored in the first means, the second means determining an estimated channel impulse response of each of possible transmitted data sequences; and third means for determining a plurality of branch metrics using the receive signal, the possible transmitted data sequence and the estimated channel impulse response.

BRIEF DESCRIPTION OF THE DRAWINGS

The features and advantages of the present invention will become more clearly appreciated from the following description taken in conjunction with the accompanying drawings in which like elements are denoted by like reference numerals and in which.

DETAILED DESCRIPTION OF THE PREFERRED EMBODIMENTS

Figure 1:
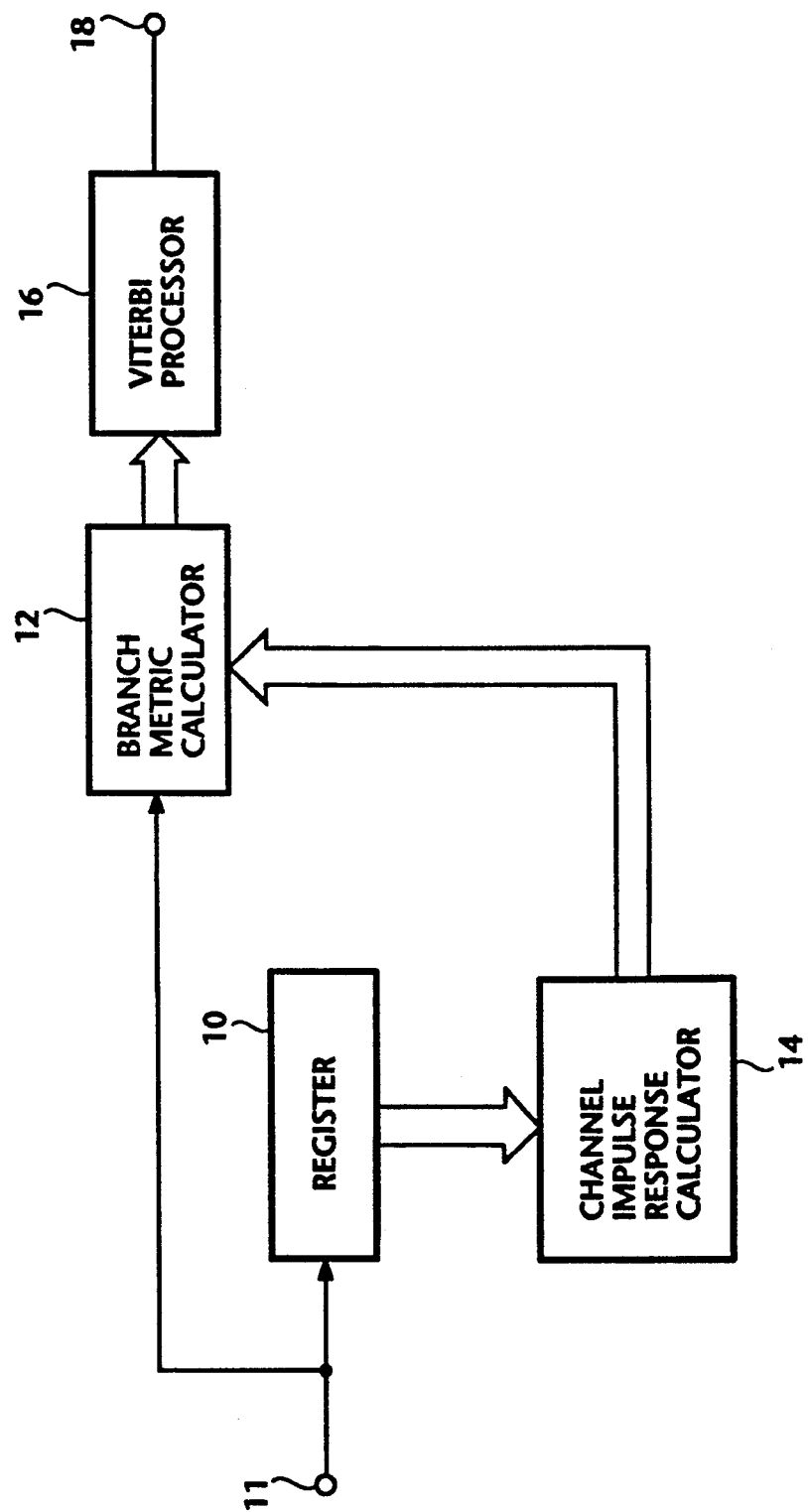
FIG. 1 is a block diagram showing the circuit arrangement which characterizes a first embodiment of the present invention.

Reference is now made to FIG. 1 wherein a first embodiment of the present invention is illustrated in block diagram form.

Before discussing the first embodiment in detail, the principle underlying same will first be described. A finite impulse response $\vec{h}_t^T$ of $(L+1)$ symbols can be expressed in the form of vector as shown below.

$$\vec{h}_t^T = [h_t^0, h_t^1, \ldots, h_t^L] \tag{1}$$

where T denotes a transposition, and L denotes the number of Intersymbol Interference (ISI) components. Data included in a receive data sequence $(r_t)$, are successively stored in a register 10 via an input terminal 11 at a predetermined time interval. Although not illustrated, the register 10 includes a plurality of memories and takes the form of shift-register. When a receive signal at a time point $(t+1)$ is applied to the register 10, the register 10 has stored data within the time period corresponding to the integer N in the form of $[r_t, r_{t-1}, \ldots, r_{t-N+1}]$. Accordingly, the receive signal vector $\vec{r}_t$ at the time point (t) is given by $$\vec{r}_t^T = [r_t, r_{t-1}, \ldots, r_{t-N+1}] \tag{2}$$

At the time point $(t+1)$, the vector $\vec{r}_t^T$ is applied to a channel impulse response calculator 14.

The calculator 14 determines, using the method of least squares, a channel impulse response of each of the possible transmitted signal sequences at the time point (t). Designating a vector $\vec{s}_t^T$ as a sequence of signals transmitted during a time duration L up to the time point (t), and also designating $v_t$ as an additive noise independent of transmitted data, a receive signal $r_t$ at the time point (t) is given by $$r_t = \vec{s}_t^T * \vec{h}_t + v_t \tag{3}$$

where * denotes convolution, and $\vec{s}_t^T = [s_t, s_{t-1}, \ldots, s_{t-L}]$. Throughout the instant specification, equation (3) is referred to as the "channel" equation.

When collecting N channel impulse response equations between time points $(t-N+1)$ and (t), a channel equation over N time points can be expressed by $$\vec{r}_t = S_t^T * \vec{h}_t + \vec{v}_t \tag{4}$$

where $$S_t^T = \begin{bmatrix} s_t & s_{t-1} & \cdots & s_{t-L} \\ s_{t-1} & s_{t-2} & \cdots & s_{t-L-1} \\ s_{t-N+1} & s_{t-N} & \cdots & s_{t-L-N+1} \end{bmatrix} \tag{5}$$

and $$\vec{v}_t^T = [v_t, v_{t-1}, \ldots, v_{t-N+1}] \tag{6}$$

Under the assumption that each of the variations of channel impulse responses is negligible over N symbols $(N \geq L+1)$ (viz., $\vec{h}_t = \vec{h}_{t-1} = \ldots = \vec{h}_{t-N+1}$), the channel impulse response calculator 14 estimates the channel impulse response vector $\vec{h}_t$ using equation (4) according to the method of least squares. In more specific terms, a transmission signal matrix St is produced in connection with each of all the combinations of transmission signal derived from a signal sequence $$(s_t, s_{t-1}, \ldots, s_{t-L-N+1}) \tag{7}$$

Following this, the calculator 14 determines an impulse response vector $\vec{h}_{t,ls}$ using the following equation (8) against each of the transmission signal matrices St obtained.

$$\vec{h}_{t,ls} = (S_t^T \cdot S_t)^{-1} \cdot S_t^T \vec{r}_t \tag{8}$$

In particular, in the event that the number of the receive signals (viz., N) for use in estimating impulse responses, is equal to the number of the components of channel impulse responses $(L+1)$, then the transmission signal matrix St is a square matrix. Accordingly, an estimated value of a channel impulse response using the least square estimation, can be obtained merely by multiplying a receive signal by the inverse of the transmission matrix St. That is, $$\vec{h}_{t,ls} = S_t^{-1} \vec{r}_t \tag{9}$$

A branch metric calculator 12 determines a plurality of branch metrics Mt using the following equation (10).

$$Mt(s_t, s_{t-1}, \ldots, s_{t-L-N+1}; s_{t+1}) = |r_{t+1} - \vec{s}_{t+1}^T \vec{h}_{t,ls}|^2. \tag{10}$$

A Viterbi processor 16 determines a transmission signal sequence over all the times which minimizes the path metric using the Viterbi algorithm.

For the sake of understanding the above-mentioned first embodiment, let us consider a particular case where $L=1$ and $N=2$. Thus, equation (1) can be expressed in this particular instance.

$$\vec{h}_t^T = [h_t^0, h_t^1] \tag{11}$$

Further, a channel equation which corresponds to equation (2) can be written as $$\begin{bmatrix} r_t \\ r_{t-1} \end{bmatrix} = \begin{bmatrix} s_t & s_{t-1} \\ s_{t-1} & s_{t-2} \end{bmatrix} \begin{bmatrix} h_t^0 \\ h_t^1 \end{bmatrix} + \begin{bmatrix} v_t \\ v_{t-1} \end{bmatrix} \tag{12}$$

It is assumed that each of the signals is a binary signal (viz., $\{1, -1\}$), then the possible signal sequences $(s_t, s_{t-1}, s_{t-2})$ are eight in total:

(1, 1, 1), (1, 1, −1), (1, −1, 1),
(1, −1, −1), (−1, 1, 1), (−1, 1, −1),
(−1, −1, 1), (−1, −1, −1)

The channel impulse response calculator 14 determines the following 8 (eight) channel impulse response vectors:

$\vec{h}_{t,ls}(1, 1, 1), \vec{h}_{t,ls}(1, 1, -1)$
$\vec{h}_{t,ls}(1, -1, 1), \vec{h}_{t,ls}(1, -1, -1)$
$\vec{h}_{t,ls}(-1, 1, 1), \vec{h}_{t,ls}(-1, 1, -1)$
$\vec{h}_{t,ls}(-1, -1, 1), \vec{h}_{t,ls}(-1, -1, -1)$ The branch metric calculator 12 determines the following 16 branch metrics, using the above-mentioned 8 channel impulse response vectors and the receive signal at the time point $(t+1)$.

$$\begin{aligned}
Mt(1, 1, 1{:}1) &= |r_{t+1} - [1, 1]^T \vec{h}_{t,ls}(1, 1, 1)|^2 \\
Mt(1, 1, 1{:}-1) &= |r_{t+1} - [-1, 1]^T \vec{h}_{t,ls}(1, 1, 1)|^2 \\
Mt(1, 1, -1{:}1) &= |r_{t+1} - [1, 1]^T \vec{h}_{t,ls}(1, 1, -1)|^2 \\
Mt(1, 1, -1{:}-1) &= |r_{t+1} - [-1, 1]^T \vec{h}_{t,ls}(1, 1, -1)|^2 \\
Mt(1, -1, 1{:}1) &= |r_{t+1} - [1, 1]^T \vec{h}_{t,ls}(1, -1, 1)|^2 \\
Mt(1, -1, 1{:}-1) &= |r_{t+1} - [-1, 1]^T \vec{h}_{t,ls}(1, -1, 1)|^2 \\
Mt(1, -1, -1{:}1) &= |r_{t+1} - [1, 1]^T \vec{h}_{t,ls}(1, -1, -1)|^2 \\
Mt(1, -1, -1{:}-1) &= |r_{t+1} - [-1, 1]^T \vec{h}_{t,ls}(1, -1, -1)|^2 \\
Mt(-1, 1, 1{:}1) &= |r_{t+1} - [1, -1]^T \vec{h}_{t,ls}(-1, 1, 1)|^2 \\
Mt(-1, 1, 1{:}-1) &= |r_{t+1} - [-1, -1]^T \vec{h}_{t,ls}(-1, 1, 1)|^2 \\
Mt(-1, 1, -1{:}1) &= |r_{t+1} - [1, -1]^T \vec{h}_{t,ls}(-1, 1, -1)|^2 \\
Mt(-1, 1, -1{:}-1) &= |r_{t+1} - [-1, -1]^T \vec{h}_{t,ls}(-1, 1, -1)|^2 \\
Mt(-1, -1, 1{:}1) &= |r_{t+1} - [1, -1]^T \vec{h}_{t,ls}(-1, -1, 1)|^2 \\
Mt(-1, -1, 1{:}-1) &= |r_{t+1} - [-1, -1]^T \vec{h}_{t,ls}(-1, -1, 1)|^2 \\
Mt(-1, -1, -1{:}1) &= |r_{t+1} - [1, -1]^T \vec{h}_{t,ls}(-1, -1, -1)|^2 \\
Mt(-1, -1, -1{:}-1) &= |r_{t+1} - [-1, -1]^T \vec{h}_{t,ls}(-1, -1, -1)|^2
\end{aligned} \tag{13}$$

The Viterbi processor 16 is supplied with the 16 branch metrics and determines the path with a minimum path-metric. The output of the Viterbi processor 16 is derived from an output terminal 18.

The operations of the Viterbi processor 16 are identical to those disclosed in the papers (1) and (2), and hence no further discussion will be referred to for brevity.

In the above, the branch metrics have been specified using square errors as shown in equation (13). However, the instant embodiment is not limited to such a method and may involve the cases: (a) by expanding equation

(13) and then removing the common terms $r_{t+1}^2$ or (b) removing the common terms $r_{t+1}^2$ and then changing the sign of the second term of the right of equation (13), by way of example.

As previously mentioned, the first embodiment is well suited for use with the channel of a nature wherein the channel impulse responses change rapidly in terms of time. However, with the first embodiment, some improvements are still required. More specifically, the channel equation (4) is unable to be solved with a particular pattern of the transmission signal sequence and hence channel impulse responses are rendered indefinite or uncertain. Further, the channel equation (4) is independently solved at each time point and, accordingly the estimation of the channel impulse response is liable to vary in the presence of noise. It follows that the data sequences are not correctly estimated in such a case.

Figure 2:
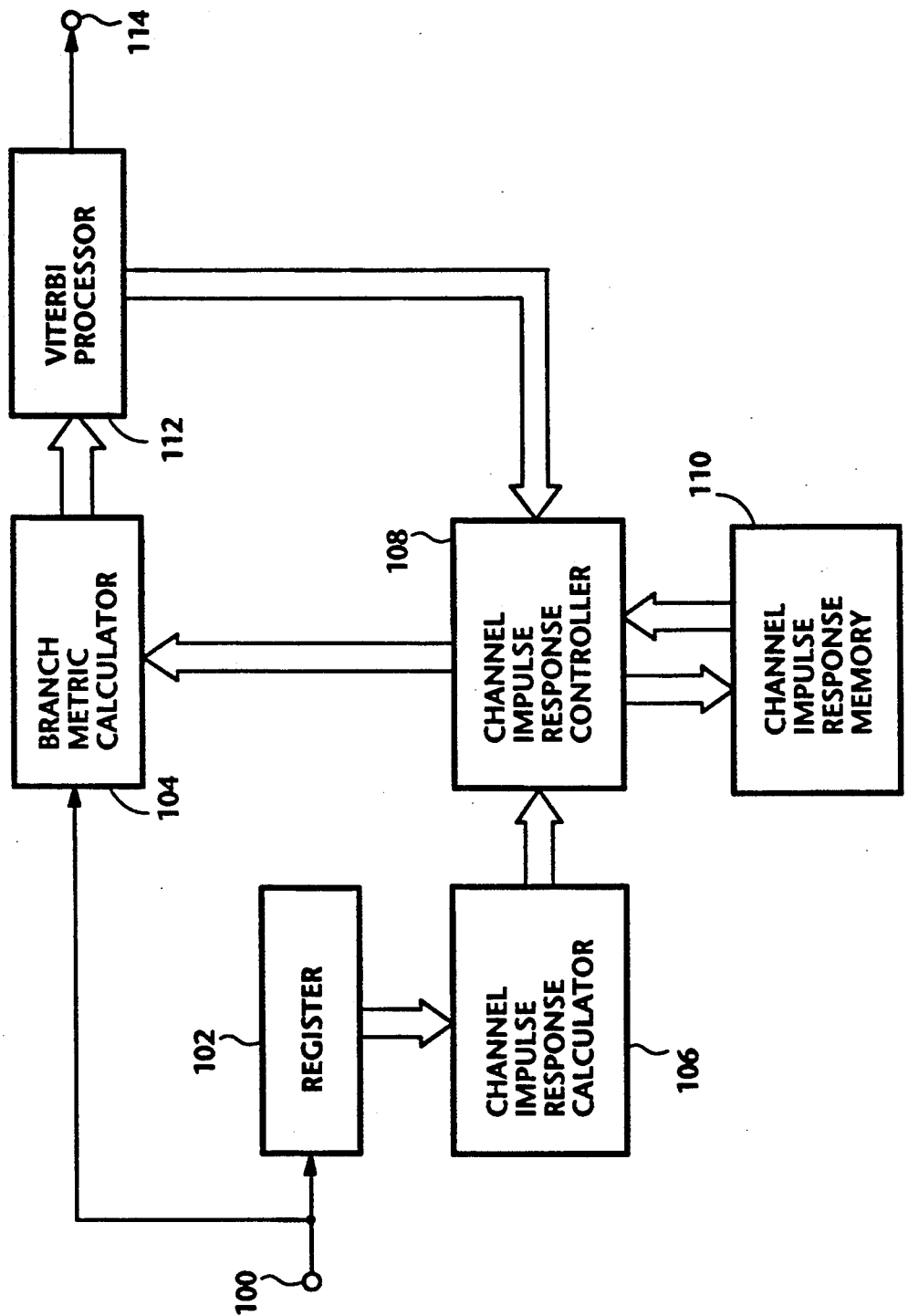
FIG. 2 is a block diagram showing an arrangement which characterizes a second embodiment of the present invention.

Reference is made to FIG. 2, wherein a second embodiment of the instant invention is shown in block diagram.

A plurality of signals included in a signal sequence $\{r_t\}$, are successively stored in a register 102 and also applied to a branch metric calculator 104 both via an input terminal 100. N receive signals stored in the register 102 between time points $(t-N+1)$ to (t), are then applied to a channel impulse response calculator 106.

The calculator 106 determines the channel impulse response vectors $h_{t,ls}$ according to one of equations (8), (9) in connection with each of the possible combinations of $(s_t, s_{t-1}, \ldots, s_{t-L-N+1})$, and applies the resultants to a channel impulse response controller 108 with the exception referred to below.

The exception where the calculator 106 does not supply the controller 108 with the channel impulse response $\tilde{h}_{t,ls}$, will be described. With the case of the combination wherein the matrix $St^T S_t$ or $St$ is rendered singular, the channel impulse response calculator 106 outputs a predetermined signal (a logic 0 for example) instead of the vector $\tilde{h}_{t,ls}$. Thus, the channel impulse response controller 108 is notified the vector $\tilde{h}_{t,ls}$ is singular.

In the above, each of the matrices $(St^T St)^{-1} St^T$ and $St^{-1}$ in equations (8) and (9), can be specified by the transmission signals. Accordingly, $(St^T St)^{-1} St^T$ and $St^{-1}$ for all of the possible combinations of $(s_t, s_{t-1}, \ldots, s_{t-L-N+1})$ can previously be calculated and then stored in the calculator 106.

An estimated value of the channel impulse response which is not indefinite or uncertain, will be called a "properly estimated value" merely for the convenience of description.

If the vector $\tilde{h}_{t,ls}$ ascertained by the calculator 106 is a properly estimated value (viz., not singular or exceptional), the channel impulse response controller 108 merely relays same to a channel impulse response memory 110. Contrarily, if the controller 108 is supplied with a logic 0 from the calculator 106, the controller 108 receives path histories of survivor paths from a Viterbi processor 112 and, determines the state which a survivor path connected thereto assumes at time point (viz., $t-1$) immediately before time point (viz., t). Following this, the controller 108 retrieves, from the memory 110, the channel impulse response vector $\tilde{h}_{t-1,ls}$ which corresponds to the connected state at the time point immediately before the instant one. The controller 108 stores the vector $\tilde{h}_{t-1,ls}$ in the memory 110 as the vector $\tilde{h}_{t,ls}$. Accordingly, the channel impulse response memory 110 stores the properly estimated value in connection with each of all the states.

Subsequently, the controller 108 supplies the branch metric calculator 104 with all of the channel impulse responses stored in the memory 110. The branch metric calculator 104 calculates the branch metrics in connection with all the possible states using equation (10). The branch metrics thus obtained are applied to the Viterbi processor 112, which outputs an estimated sequence by minimizing the sum of the branch metrics applied. The output of the Viterbi processor 112 appears at an output terminal 114. The operations of a Viterbi processor have been described in detail in the papers (1), (2) and hence further descriptions thereof will be omitted for brevity.

Figure 3:
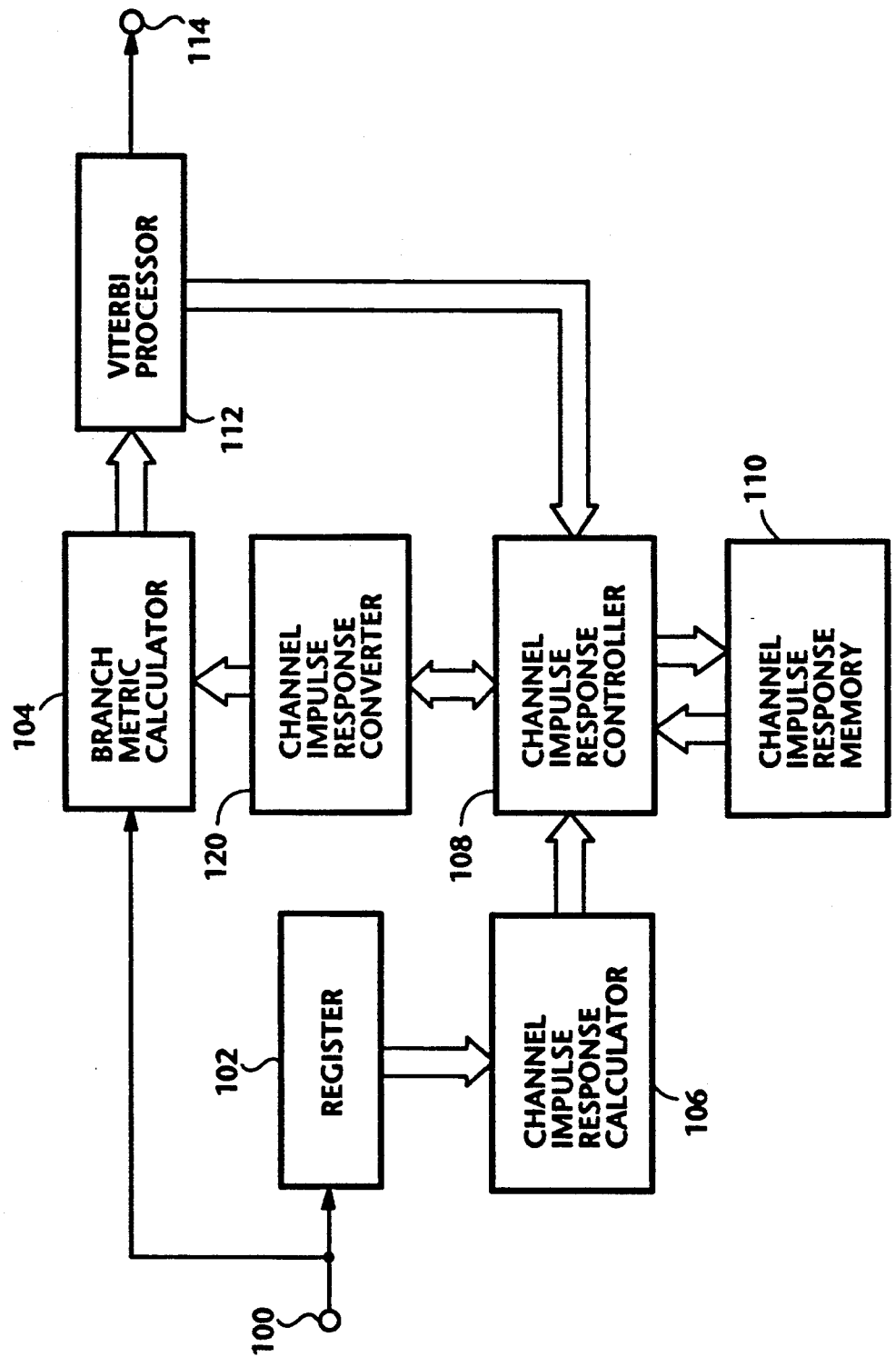
FIG. 3 shows a third embodiment of the present invention in block diagram form.

FIG. 3 shows a third embodiment of the present invention. The arrangement of FIG. 3 includes a channel impulse response converter 120 and other than this, is substantially identical with that of FIG. 2. Accordingly, the counterparts of FIG. 3 are labelled with like reference numerals.

The converter 120 is provided between the branch metric calculator 104 and the channel impulse response controller 108, and is coupled to the Viterbi processor 112. The converter 120 operates as follows:

(a) receiving the channel impulse response vectors $\tilde{h}_{t,ls}$ from the memory 110 via the controller 108;

(b) receiving survivor path information from the Viterbi processor 112 in connection with time points $(t-1), (t-2), \ldots, (t-n)$;

(c) receiving, from the memory 110 via the controller 108, the channel impulse response vectors $\tilde{h}_{t-1,ls}, \tilde{h}_{t-2,ls}, \ldots, \tilde{h}_{t-n,ls}$ in connection with the survivor paths;

(d) calculating a new channel impulse response vector $\tilde{h}_t'$ which is a simple mean value (viz., $\tilde{h}_t' = (\tilde{h}_{t,ls} + \tilde{h}_{t-1,ls} + \ldots + \tilde{h}_{t-n,ls})/(n+1)$; and (e) applying the new channel impulse response vectors $\tilde{h}_t'$ to the branch metric calculator 104.

The inclusion of the converter 120 enables the estimated value of each of the channel impulse responses to be smoothed, which implies that noises added over signal transmission are effectively removed. Further, the channel impulse response at the time (t) is given a high correlation with the past channel impulse responses and, accordingly, abrupt change of the channel impulse response can be prevented. Summing up, the instant embodiment is such that a high probability of estimating channel impulse response is assured through the provision of the converter 120.

Figure 4:
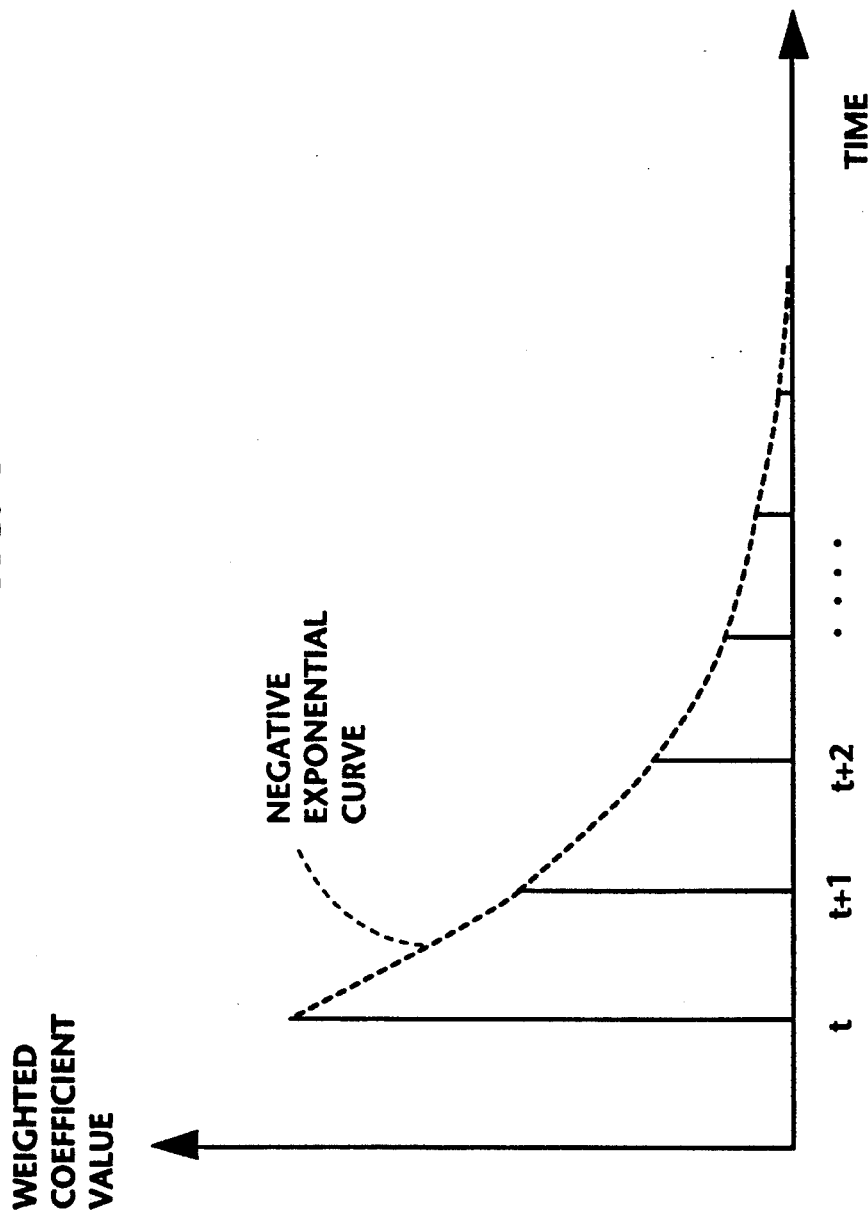
FIG. 4 is graph showing the manner which the weighted coefficient value used in the third embodiment of the invention, varies with respect to time.

In the above, each of the new channel impulse responses $\tilde{h}_t'$ has been determined using a simple mean calculation, however, can be obtained by other various methods such as weighted mean calculation by way of example. In the third embodiment, each of the new channel impulse responses is obtained using a weighted mean technique wherein weighted coefficient values decrease along a negative exponential curve as shown in FIG. 4.

Figure 5:
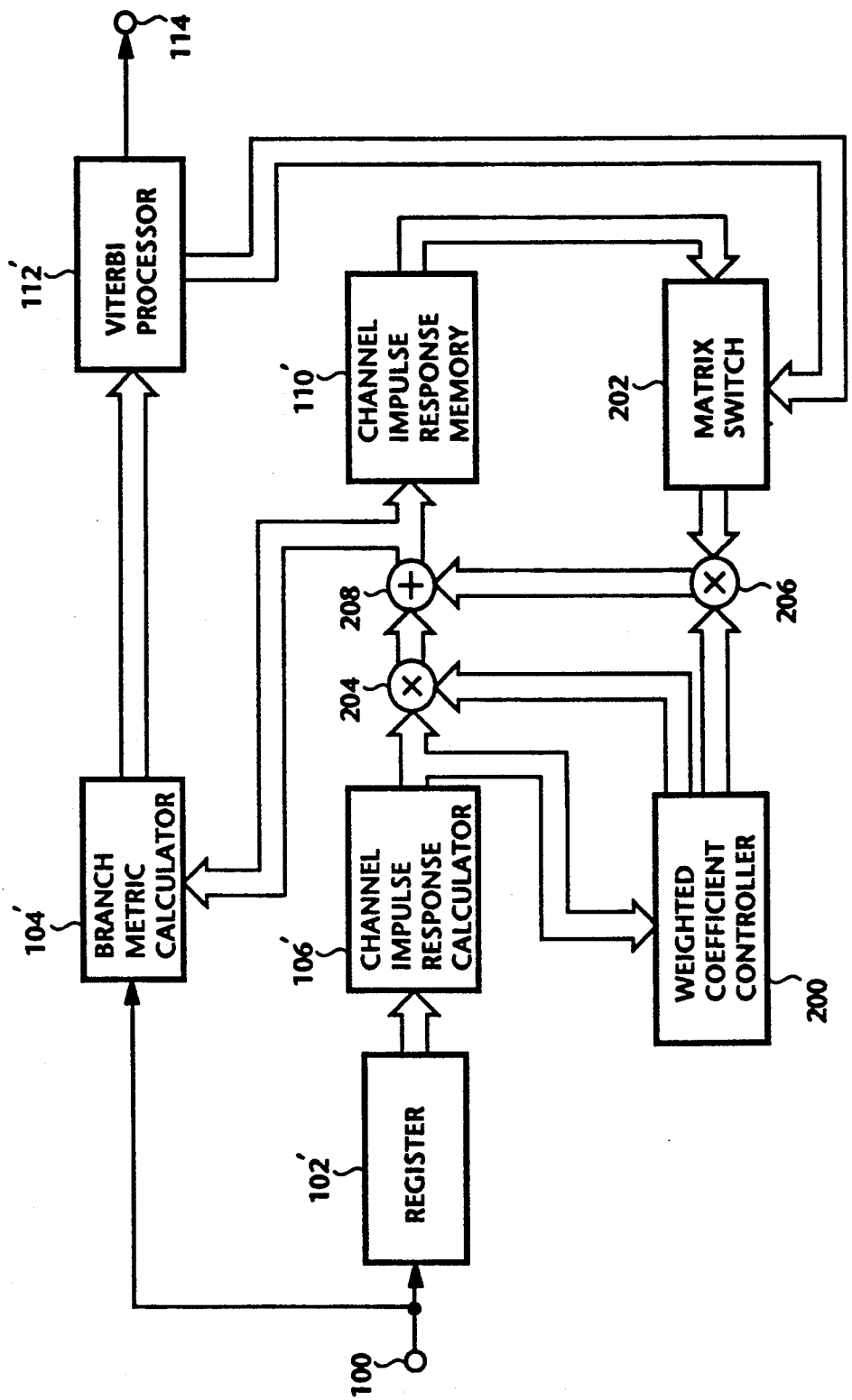
FIG. 5 is a block diagram showing a fourth embodiment of the present invention.

Reference is now made to FIG. 5, wherein there is shown in block diagram form a fourth embodiment of the present invention. For the convenience of comparisons, each of the blocks of FIG. 5, which corresponds to those shown in FIG. 3, is labelled with same numeral plus a prime.

The arrangement of FIG. 5 additionally includes a weighted coefficient controller 200, a matrix switch 202, two multipliers 204, 206, and an adder 208 as compared with that of FIG. 3. For the sake of description, it is assumed that a channel impulse response memory 110' stores only the channel impulse response vectors $\bar{h}_{t,ls}$ and $\bar{h}_{t-1,ls}$ at time points (t) and (t−1).

The weighted coefficient controller 200 is adapted to check to see if each of the channel impulse response vectors $\bar{h}_{t,ls}$ is singular or non-singular. In the event that the impulse response vector $\bar{h}_{t,ls}$ is found to be singular, the controller 200 applies weighted n coefficients "0", "1" to the multipliers 204, 206, respectively. On the contrary, if the response vector $\bar{h}_{t,ls}$ is ascertained to be non-singular, the controller 200 supplies the multipliers 204, 206 with coefficients "0.6", "0.4" for example. It should be noted that even if the response vector $\bar{h}_{t,ls}$ does not fall in singularity, the multipliers 204, 206 are supplied with the coefficients "0", "1" respectively until the memory 110' stores completely the channel impulse response vectors.

In the FIG. 5 arrangement, the blocks (viz., the memory 110', the matrix switch 202, the multipliers 204, 206, and the adder 208) form a recursive type filter which produces a new channel impulse response vector $\bar{h}_t''$ from the adder 208.

As above mentioned, the channel impulse response obtained by the calculator 106' is singular, the multipliers 204 and 206 respectively receive the weighted coefficients "0" and "1". Thus, the estimated value of the channel impulse response vector at time point (t) automatically takes the value of a vector $\bar{h}_{t-1}''$ at time point (t−1) instead of a vector $\bar{h}_t''$ at time point (t). In order to prevent the vector $\bar{h}_t''$ from diverging, the sum of the two weighted coefficients is made not to exceed one (1).

The channel impulse response vectors $\bar{h}_t''$, which has been determined with respect to all possible states, are stored in the memory 110' and also applied to the branch metric calculator 104'. It should be noted that each of the channel impulse responses stored in the memory 110' takes the value which undergoes the above-mentioned value conversion.

The matrix switch 202 is supplied with the vector $\bar{h}_{t-1}''$ stored in the memory 110'. The matrix switch 202 is adapted to rearrange the channel impulse response vectors $\bar{h}_{t-1}''$ according to the survivor path information applied from the Viterbi processor 112'. More specifically, the matrix switch 202 functions such that the channel impulse response vectors $\bar{h}_{t-1}''$ correspond correctly, at the adder 208, to the vectors $\bar{h}_t''$ whose states have passes the states of the above-mentioned vectors $\bar{h}_{t-1}''$.

The operations of the branch metric calculator 104' and the Viterbi processor 112', are identical with those previously mentioned, and hence further descriptions thereof will be omitted for brevity.

While the foregoing description describes four embodiments according to the present invention, the various alternatives and modifications possible without departing from the scope of the present invention, which is limited only by the appended claims, will be apparent to those skilled in the art.

What is claimed is:

1. A sequence estimator for estimating a data sequence which is to be transmitted using a Viterbi processor connected to said sequence estimator, comprising:

first means for storing, at a predetermined time interval, signals applied to the sequence estimator;

second means coupled to receive the signals stored in said first means, said second means determining an estimated channel impulse response of each of possible transmitted data sequences; and third means for determining a plurality of branch metrics in response to the applied signals, the possible transmitted data sequences and the estimated channel impulse response, and providing said branch metrics to said Viterbi processor.

2. A sequence estimator as claimed in claim 1, wherein said second means issues a control signal in the event that the estimated channel impulse response is not specified, the sequence estimator further comprising:

fourth means being arranged to store the estimated channel impulse responses; and fifth means for storing the estimated channel impulse responses into said fourth means in the event that each of the estimated channel impulse responses is specified at said second means, said fifth means receiving survivor path information from the Viterbi processor and retrieving an estimated channel impulse response from said fourth means at a time point immediately before the instant time point in response to the survivor path information, said fifth means replacing the estimated channel impulse response which has not been specified at said second means with the estimated channel impulse response retrieved from said fourth means.

3. A sequence estimator as claimed in claim 2, wherein said fifth means supplies said third means with the estimated channel impulse responses stored in said fourth means.

4. A sequence estimator as claimed in claim 1, wherein said second means issues a control signal in the event that the estimated channel impulse response is not specified, the sequence estimator further comprising:

fourth means being arranged to store the estimated channel impulse responses; and fifth means for storing the estimated channel impulse responses into said fourth means in the event that each of the estimated channel impulse responses is specified at said second means, said fifth means receiving survivor path information from the Viterbi processor and retrieving an estimated channel impulse response from said fourth means at a time point immediately before the instant time point in response to the survivor path information, said fifth means replacing the estimated channel impulse response which has not been specified at said second means with the estimated channel impulse response retrieved from said fourth means, wherein said fifth means supplies said third means with the estimated channel impulse responses stored in said fourth means.

5. A sequence estimator as claimed in claim 3, further comprising:

sixth means being coupled to receive the estimated channel impulse responses from said fourth means under the control of said fifth means, said sixth means producing a simple mean value of estimated channel impulse responses over more than two subsequent time points according to survivor path information from the Viterbi processor.

6. A sequence estimator as claimed in claim 3, further comprising:

sixth means being coupled to receive the estimated channel impulse responses from said fourth means under the control of said fifth means, said sixth means producing a weighted mean value of estimated channel impulse responses over more than two subsequent time points according to survivor path information from the Viterbi processor.

7. A sequence estimator as claimed in claim 1, further comprising:
a weighted coefficient controller; and
a recursive type filter coupled to said weighted coefficient controller, said second and third means, and the Viterbi processor.

8. A sequence estimator as claimed in claim 7, wherein said recursive type filter comprising:
a first multiplier having two inputs which are coupled to said weighted coefficient controller and said second means, said first multiplier having one output;
a matrix switch having first and second inputs and one output, the first input of the matrix switch being coupled to said Viterbi processor;
a second multiplier having two inputs which are coupled to said weighted coefficient controller and said matrix switch, said second multiplier having one output;
an adder having two inputs which are coupled to the outputs of said first and second multipliers, said adder applying the output thereof to said third means; and
a memory having an input coupled to the output of said adder and having an output coupled to the second input of said matrix switch.

9. A method of estimating a data sequence which is to be transmitted using a Viterbi processor, comprising the steps of:
(a) storing, at a predetermined time interval, incoming signals;
(b) receiving the incoming signals stored in step (a), and determining an estimated channel impulse response of each of possible transmitted data sequences;
(c) determining a plurality of branch metrics in response to the incoming signals received, the possible transmitted data sequences and the estimated channel impulse response; and
(d) estimating a data sequence using the plurality of branch metrics obtained in step (c) by employing said Viterbi processor.

* * * * *